May 24, 1932.  M. G. GILBERT  1,859,919
RECOVERY OF TIN FROM SCRAP TIN PLATE AND LIKE TIN BEARING MATERIALS
Filed Oct. 23, 1929
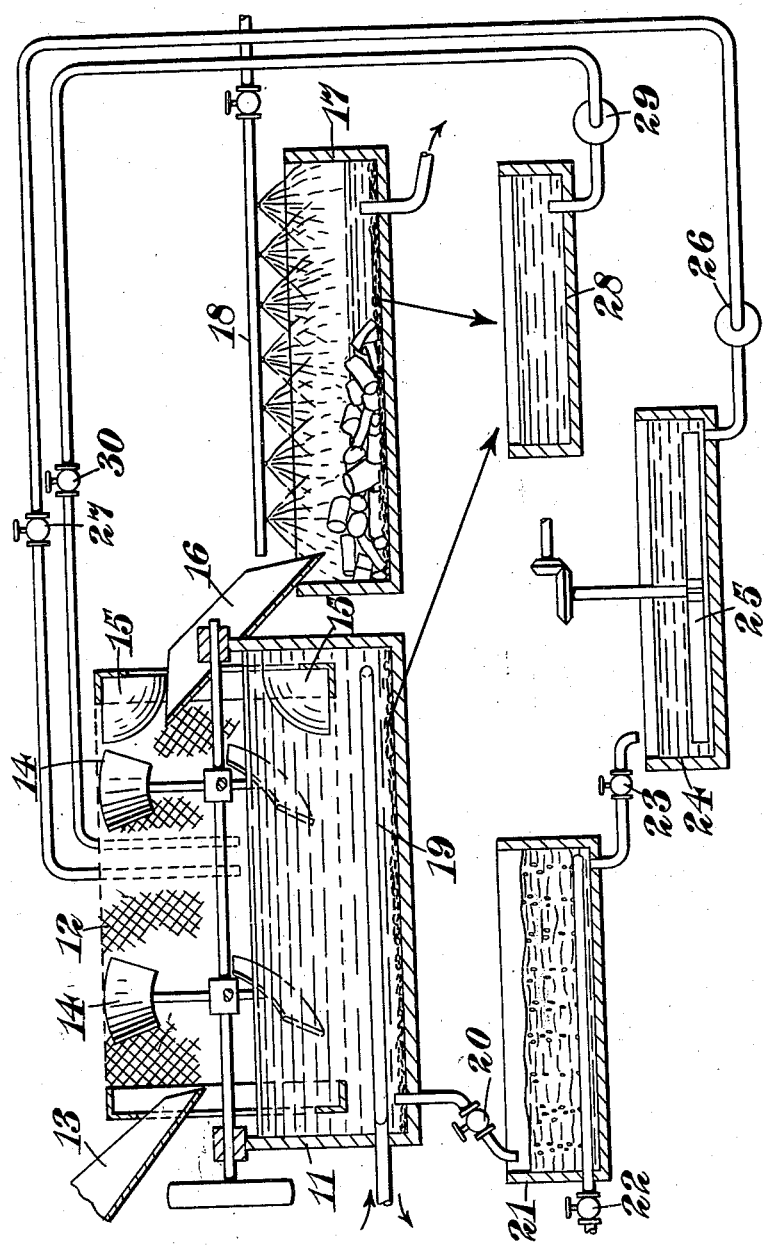

Patented May 24, 1932

1,859,919

UNITED STATES PATENT OFFICE

MASON GEORGE GILBERT, OF PORT ELIZABETH, SOUTH AFRICA, ASSIGNOR TO THE AFRICAN TIN RECOVERY COMPANY LIMITED, OF PORT ELIZABETH, SOUTH AFRICA, A COMPANY OF THE UNION OF SOUTH AFRICA

RECOVERY OF TIN FROM SCRAP TIN PLATE AND LIKE TIN BEARING MATERIALS

Application filed October 23, 1929, Serial No. 401,904, and in Great Britain January 15, 1929.

This invention is for improvements in or relating to the recovery of tin from scrap tin-plate and like tin-bearing materials. The invention has particular reference to the detinning of tin-plate scrap and its principal object is to provide an improved process therefor. Tin-plate scrap contains solder and it is found that by the process according to this invention tin is not only removed from the surface of the scrap but also from the solder thereon. The invention is therefore applicable also to the extraction of tin from tin-containing alloys such for example as solder and white metal.

Processes have been proposed for the recovery of tin from scrap metal in which there is employed a solution consisting of a lead compound such as "litharge" dissolved in a solution of caustic soda or potash.

According to the present invention a process for the recovery of tin from tin-carrying metals of the kind described by treatment with an alkaline solution (preferably caustic) of a soluble lead salt is characterized by the fact that the soluble lead salt is lead acetate. A preferred alkali for the preparation of the solution is caustic soda.

It is found that a solution of this description gives a peculiarly rapid and complete action which may be described as instantaneous. It also leads to certain operating advantages in the process. For example, the point at which the solution is exhausted of lead is a noticeably sharp one and the bath can be used right up to this point with success.

Preferably the treatment is effected with a hot solution (for example a solution maintained at or near its boiling point).

The effect of the immersion of tin-carrying metals in a solution of the above description is to cause an almost instantaneous removal of the tin and simultaneously a deposition of finely divided lead upon the iron plate or other residue metal. The lead, however, is not adherent to the residue metal and can readily be recovered. The tin passes into solution in the extracting bath and can be readily recovered from the resultant liquor.

According to a further feature of the invention, the resultant tin-containing solution is treated with a reagent, for example carbon dioxide, which will precipitate the tin from the solution. The tin is precipitated in the form of metastannic acid in a very pure condition. The solution from which tin has thus been precipitated may be treated for example with burnt lime to regenerate caustic alkali for re-use in the process.

An alternative method of recovering the tin in the tin-containing solution is to treat the solution with milk of lime. This precipitates the tin in the form of calcium stannate and the residual solution of caustic soda is returned to the process.

The solution after treatment with lime for the precipitation of the dissolved tin as calcium stannate contains calcium acetate and caustic alkali. Since caustic alkali is less soluble in a hot solution than in a cold, the solution may be heated to precipitate the calcium acetate.

Again, the tin may, if desired, be precipitated in metallic form by the addition of a suitable subdivided metal, for example granulated zinc.

It is an important advantage of the use of an extracting solution according to this invention that the solution gives up the whole of its lead and in consequence the tin precipitated from the solution is entirely free from contamination with lead. In addition, continuous regeneration of the active lead salt solution, for example as hereinafter described, is greatly facilitated.

The lead precipitated from the solution during the dissolution of the tin may be treated with acetic acid whereby lead acetate is regenerated for employment again in the process.

In the process of this invention, in contrast to the case where lead oxide such as massicot or litharge is dissolved in caustic alkali solution, all the lead of the lead salt instead of only about one half of it, is available in an active condition. An alkali plumbite is formed without at the same time the formation of a plumbate. These facts result in a very complete reaction.

One form of the process will now be described by way of example with reference to the accompanying drawing which illustrates diagrammatically an apparatus in which the process may be carried into effect:—

The apparatus comprises a de-tinning vat 11 in which rotates, partially immersed, a perforated drum 12 to receive scrap metal. The drum has a feed-chute 13 at one end, flights 14 to direct the material forwardly and lifters 15 at the discharge end. The lifters 15 discharge the de-tinned scrap into a discharge chute 16 whence it passes into a washing tank 17 under a water spray 18. The de-tinning liquid in the tank 11 is heated by a steam coil 19.

Exhausted liquid from the tank 11 is delivered by a valve 20 to a de-tinning tank 21 where it is subjected to the action of carbon-di-oxide supplied through a valve 22. From the vat 21 the liquid, deprived of its tin, passes through a valve 23 to a causticizing vat 24 containing an agitator 25 for stirring the liquid with burnt lime. Regenerated caustic alkali is re-delivered to the tank 11 by the pump 26 through a valve 27.

Lead sludge which collects in the bottoms of the vats 11 and 17 is periodically removed and shovelled into an acetic acid tank 28 where lead acetate is formed. The lead acetate is pumped by a pump 29 to the de-tinning vat 11 through a valve 30.

In carrying the process into effect the vat 11 is filled with a mixture of 20% lead acetate solution into which has been added a 20% sodium hydroxide solution until the white cloud formed on addition only just disappears. The solution so formed which is of alkaline reaction, is heated by the steam coil 19 nearly to boiling point. Waste tin plate is delivered by the chute 13 into the drum 12 where it is immersed in the solution and by rotation of the drum tumbled about. This not only ensures thorough contact with the solution, but also causes the lead which is precipitated to be washed off and to fall as a sludge to the bottom of the vat. The de-tinned scrap delivered into the washing tank 17 is washed by the water sprays free of any remaining precipitated lead, and is then taken away and disposed of. The other operations follow as above described.

In the treatment of alloys it is desirable that the alloy material, such as scrap white metal, should be broken up or disintegrated as small as possible.

I claim:

1. A regenerative process for the recovery of tin from tin-carrying metals which consists in treating the tin-carrying metal with a hot caustic alkali solution of lead acetate so as to dissolve tin from the tin carrying metal and precipitate spongy lead, treating the resulting spent de-tinning solution to precipitate tin therefrom and recover caustic alkali and acetate of alkali and regenerating de-tinning solution by dissolving said precipitated lead in a caustic alkali solution of the recovered alkali acetate, the caustic alkali which is used for this purpose being the said alkali which is recovered in the step of precipitating tin from the spent de-tinning solution.

2. The process according to claim 1, wherein the spent de-tinning solution is treated with carbon dioxide for precipitation of the tin.

3. The process according to claim 1, wherein the spent de-tinning solution is treated with carbon dioxide to precipitate tin from the solution and thereafter with burnt lime to regenerate caustic alkali.

4. A process according to claim 1, wherein the spent de-tinning solution is treated with milk of lime to precipitate tin from the solution as calcium stannate.

In testimony whereof I affix my signature.

MASON GEORGE GILBERT.